(12) United States Patent
Army et al.

(10) Patent No.: US 10,093,425 B2
(45) Date of Patent: Oct. 9, 2018

(54) ANNULAR OZONE CONVERTER WITH REPLACEABLE CORE

(71) Applicant: HAMILTON SUNDSTRAND CORPORATION, Windsor Locks, CT (US)

(72) Inventors: Donald E. Army, Enfield, CT (US); Frederick Peacos, III, North Scituate, RI (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/231,937

(22) Filed: Aug. 9, 2016

(65) Prior Publication Data
US 2018/0044026 A1  Feb. 15, 2018

(51) Int. Cl.
*B64D 13/06* (2006.01)
*B01D 53/86* (2006.01)
*C01B 13/02* (2006.01)

(52) U.S. Cl.
CPC ......... *B64D 13/06* (2013.01); *B01D 53/8675* (2013.01); *C01B 13/0203* (2013.01); *B01D 2257/106* (2013.01); *B64D 2013/0685* (2013.01)

(58) Field of Classification Search
CPC .............. B64D 13/06; B01D 53/8675
USPC ................................................ 422/122
See application file for complete search history.

(56) References Cited

U.S. PATENT DOCUMENTS

| 6,577,828 | B1 | 6/2003 | Ramos |
| 9,133,028 | B2 | 9/2015 | Army et al. |
| 2014/0308171 | A1* | 10/2014 | Army ............. C01B 13/0203 422/120 |
| 2016/0362191 | A1* | 12/2016 | Hoffjann ............. B64D 11/02 |

FOREIGN PATENT DOCUMENTS

| FR | 2357297 A1 | 2/1978 |
| FR | 2893667 A1 | 5/2007 |
| WO | 9403265 A1 | 2/1994 |
| WO | 2004113690 A1 | 12/2004 |

OTHER PUBLICATIONS

European Search Report for Application No. 17185106.6-1371, dated Nov. 15, 2017, 8 pages.

* cited by examiner

*Primary Examiner* — Kevin Joyner
(74) *Attorney, Agent, or Firm* — Cantor Colburn LLP

(57) ABSTRACT

An ozone converter includes a toroidal shaped inlet housing and an outlet housing that is removably coupled to the inlet housing. The converter also includes a ring shaped ozone removable core disposed at least partially within the inlet housing.

12 Claims, 7 Drawing Sheets

US 10,093,425 B2

ANNULAR OZONE CONVERTER WITH REPLACEABLE CORE

BACKGROUND OF THE INVENTION

The subject matter disclosed herein relates to an ozone converter and in particular to an ozone converter for use with an aircraft environmental control system.

Aircraft have power systems that are comprised of several components, such as an engine, an environmental control system (ECS) and a thermal management system. These systems are designed relatively independently from each other with power being transferred from one system to another.

The environmental control system supplies pressurized air to the cabin and flight deck of an aircraft. The ambient air is drawn either from the compressor stage of an engine (a bleed air system) or a dedicated compressor. At high altitude (e.g., greater than 20,000 ft (6096 m)), the ambient air contains unacceptable levels of ozone ($O_3$). Passenger comfort and/or compliance with regulations or agreements can limit the amount of ozone provided to the cabin and flight deck. As such, commercial aircraft generally include an ozone converter that converts ozone to oxygen ($O_2$).

Ozone converters typically include an ozone-converting core (core) that includes a catalyst which causes the ozone to decompose to oxygen. In operation, such converters are usually connected in-line with the ECS. That is, the length of the combined ECS and the converter is typically extended by at least the length of the converter (if not more) as compared to the ECS alone.

BRIEF DESCRIPTION OF THE INVENTION

According to one embodiment, an ozone converter is disclosed. The converter includes: a toroidal shaped inlet housing; an outlet housing that is removably coupled to the inlet housing; and a ring shaped ozone removable core disposed at least partially within the inlet housing.

According to another embodiment, an environment control system (ECS) is disclosed. The ECS includes: an air cycle machine including a turbine and a compressor; and an ozone converter coupled to the turbine and surrounding a portion of the turbine.

BRIEF DESCRIPTION OF THE DRAWINGS

The subject matter which is regarded as the invention is particularly pointed out and distinctly claimed in the claims included at the conclusion of the specification. The foregoing and other features, and advantages of the invention are apparent from the following detailed description taken in conjunction with the accompanying drawings in which:

DETAILED DESCRIPTION OF THE INVENTION

Figure 1:
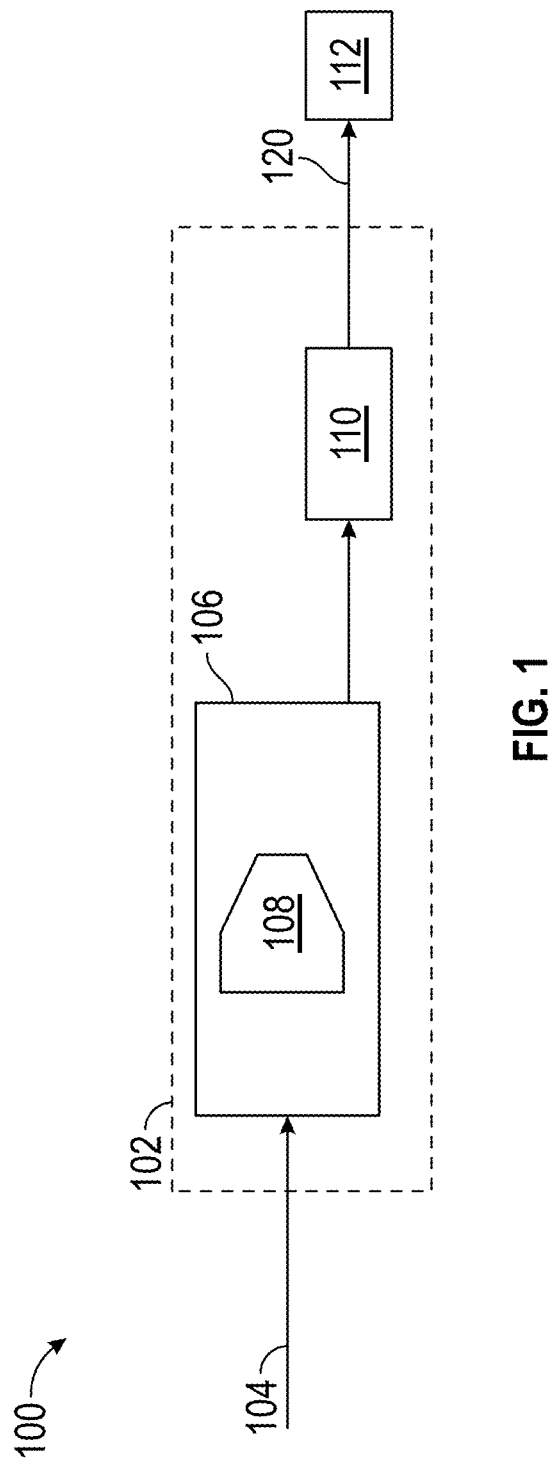
FIG. 1 is a block diagram illustrating a system in which embodiments of the present invention can be implemented.

FIG. 1 illustrates a system 100 in which embodiments of the present invention may be implemented. The system 100 can be part of an aircraft or any other type of apparatus that can cause the system 100 to be moved in a forward direction. For clarity, the following description will assume that the system 100 is part of an aircraft but it is not so limited.

The system 100 illustrated in FIG. 1 includes an environmental control system (ECS) 102. The ECS 102 receives input air 104 and provides output air 120 to a location 112 within an apparatus. For example, the location 112 could be the flight deck or passenger compartment of an aircraft. It shall be understood that the ECS 102 shown in FIG. 1 is extremely simplified and could include many other or different elements.

As illustrated, the ECS 102 includes an air parameter adjusting unit 106. The air parameter adjusting unit 106 may also be referred to as an air cycle machine (ACM) in certain instances herein. The ACM 106, generally, converts the pressure and/or temperature of the input air 104 to a desired level. In one embodiment, the input air 104 is bleed air from a compressor section of an engine. For this arrangement, the ozone converter would typically be upstream of the ECS. In another embodiment, the input air 104 is ram air received directly from the atmosphere. For this arrangement, the ozone converter would typically be downstream of the ECS compressor such that there is sufficient temperature to facilitate the ozone conversion process.

Regardless of the source of the input air 104, the air parameter adjusting unit 106 may include a parameter adjustment device 108 that can be operated to adjust the temperature/pressure of the input air 104. The parameter adjustment device 108 includes a turbine and/or a compressor. In one embodiment, the parameter adjustment device 108 is an electric compressor that compresses ram air. The turbine and the compressor may be connected to one another by shaft and be coaxial with one another in some instances.

If the input air 104 is received while the aircraft is at high altitude, there may a requirement (e.g., contractual or regulatory) that ozone be removed from the input air 104 before being provided to location 112 as output air 120. To that end, the ECS 102 also includes an ozone converter 110 coupled between the air parameter adjusting unit 106 and the location 112. The exact location of the ozone converter 110 can be varied from that shown in FIG. 1 in different embodiments of the present invention.

Figure 2:
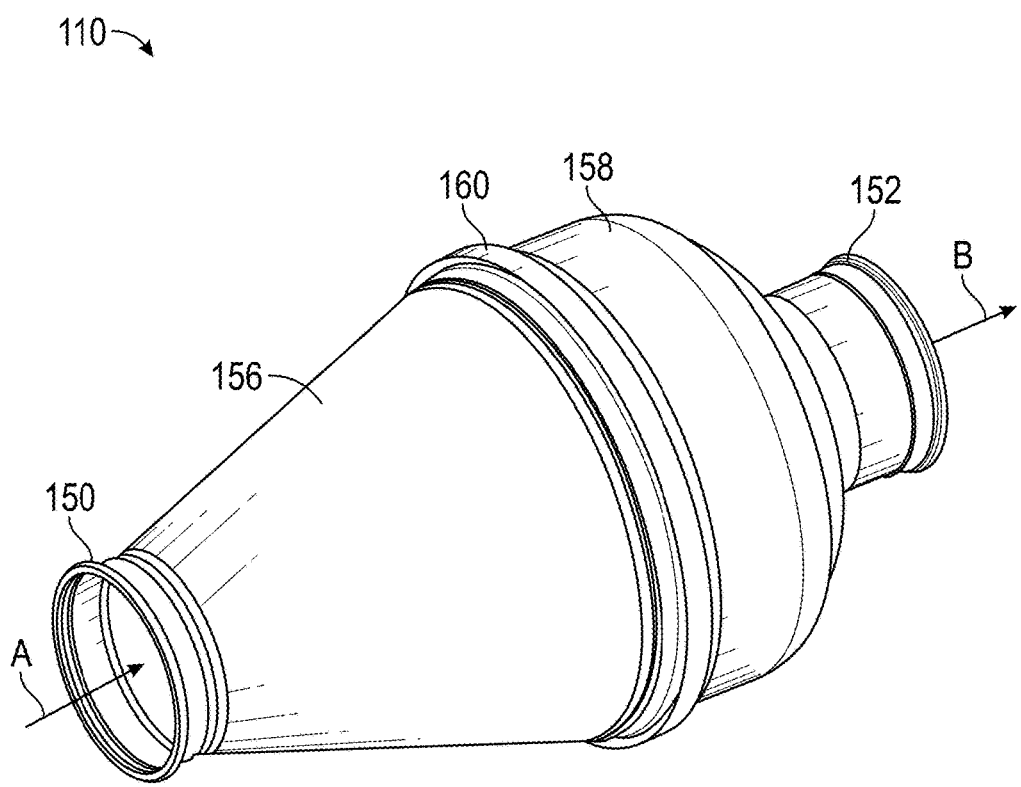
FIG. 2 is a perspective view of a prior art ozone converter.

FIG. 2 shows an example of a prior art ozone converter 110. The ozone converter 110 includes an inlet 150 into which inlet air A enters the ozone converter 110 and an outlet 152 through which outlet air B exits the ozone converter 110. Some or all of the ozone contained in inlet air A is removed in the ozone converter 110 such that the outlet air B has less ozone in it that the inlet air A. To this end, the ozone converter 110 includes a core that removes some or all of the ozone from the inlet air A to produce outlet air B. The core in the prior art and in embodiments herein can be formed of any type of material that causes or otherwise aids in the conversion of ozone into oxygen. For instance, in one embodiment, the core is formed at least partially of palladium.

In FIG. 2, the ozone converter 110 is shown as including an inlet housing 156 and an outlet housing 158. In one embodiment, one or both of the inlet and outlet housings 156, 158 are formed of titanium or a titanium alloy. The inlet and outlet housings 156, 158 are coupled together by a removable coupling 160 such as V-band coupling. It shall be understood that the removable coupling could be any type of removable coupling such as a bolted flange coupling or other means either now known or later developed for coupling two flanged members together. In the bolted flange coupling, the flanges (described below) can include holes through them and bolts or other fasteners are used to hold the elements together.

As discussed above, the ozone converter 110 may increase the length of the ECS 102 by at least the length of its outer housing. This increase in length may make it more difficult to locate the ECS 102 in an aircraft or may take up space that could otherwise be utilized by other components.

From the above, it is clear that the current art ozone converter consists of a diffuser, ozone converter core and reducing section that require a significant installation length and diameter. Disclosed herein is an annular ozone converter that provides a compact configuration that can be positioned coaxially to the ACM centerline and mounted to the ACM assembly. In such a case, the core may be sized to deliver same face area/flow velocity as a conventional converter in ~50% of the axial length. The coaxial position to the turbine outlet duct maximizes space utilization. In one embodiment, the housing of the converter may have a removable portion to allow for cleaning or replacement of life limited core.

Figure 3:
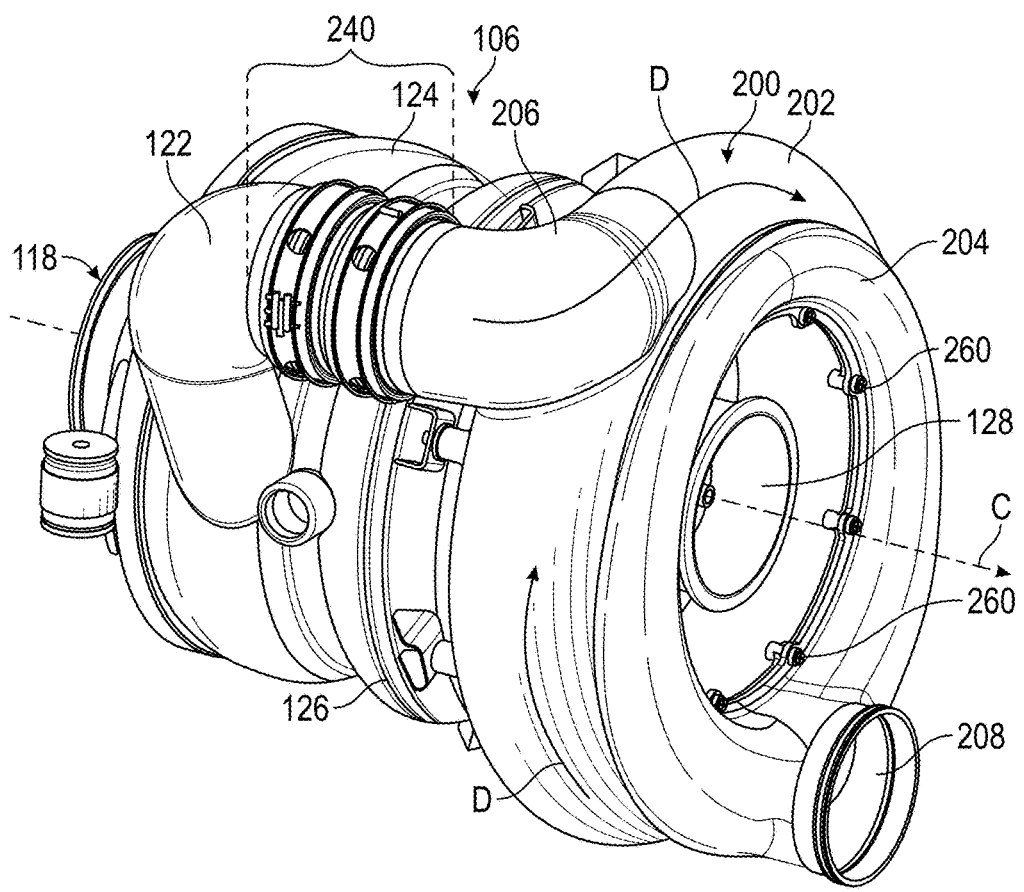
FIG. 3 is perspective view of an annular ozone converter according to one embodiment that is coaxially mounted to an air cycle machine that includes a turbine and a compressor.

As illustrated in FIG. 3, an ACM 106 that receives a medium (e.g., bleed or ram air) from an inlet 118 and provides a conditioned form of the air to a compressor output 122 is illustrated. The ACM 106 comprises a compressor 124 and a turbine 126 connected to the compressor 124 by a shaft (not illustrated) as is known in the art. As illustrated, the compressor 124 and the turbine 126 are coaxial with another and include known rotating parts that rotate about axis C.

The compressor 124 is a mechanical device that raises the pressure of the air received from the inlet 118. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the air via the turbine 126.

The turbine 126 is mechanical device that drives the compressor 124. The turbine 126 can include a plurality of inlet gas flow paths from, for example, RAM or engine compressor bleed flow. As illustrated, the turbine 126 includes a turbine outlet 128 that may, for example, provide air to a downstream heat exchanger.

As illustrated, an annular ozone converter 200 (converter) is connected to the turbine 126. The converter 200 includes a converter inlet 206 fluidly coupled to the compressor outlet 122. As more fully explained below, the converter 200 includes a core that reduces ozone in the air exiting the compressor outlet 122. The outlet of the converter 208 may be arranged such that is can be run in parallel with air exiting the turbine outlet 128 to save ducting space.

One or more connecting elements 240 may form an airtight seal between the converter inlet 206 and the compressor outlet 122. The exact nature of these connecting elements may be varied.

Air that enters the converter inlet 206 fluidly from the compressor outlet 122 is initially provided into an inlet section 202. Air travels in a generally circular path as indicated by arrow D, passes through a core within the converter 200 and enters an outlet housing 204 that includes converter outlet 208. The outlet housing 204 may be removably attached to the inlet housing 202 by one more fasteners 260. The fasteners are not limited to the screws shown in FIG. 3.

Figure 4:
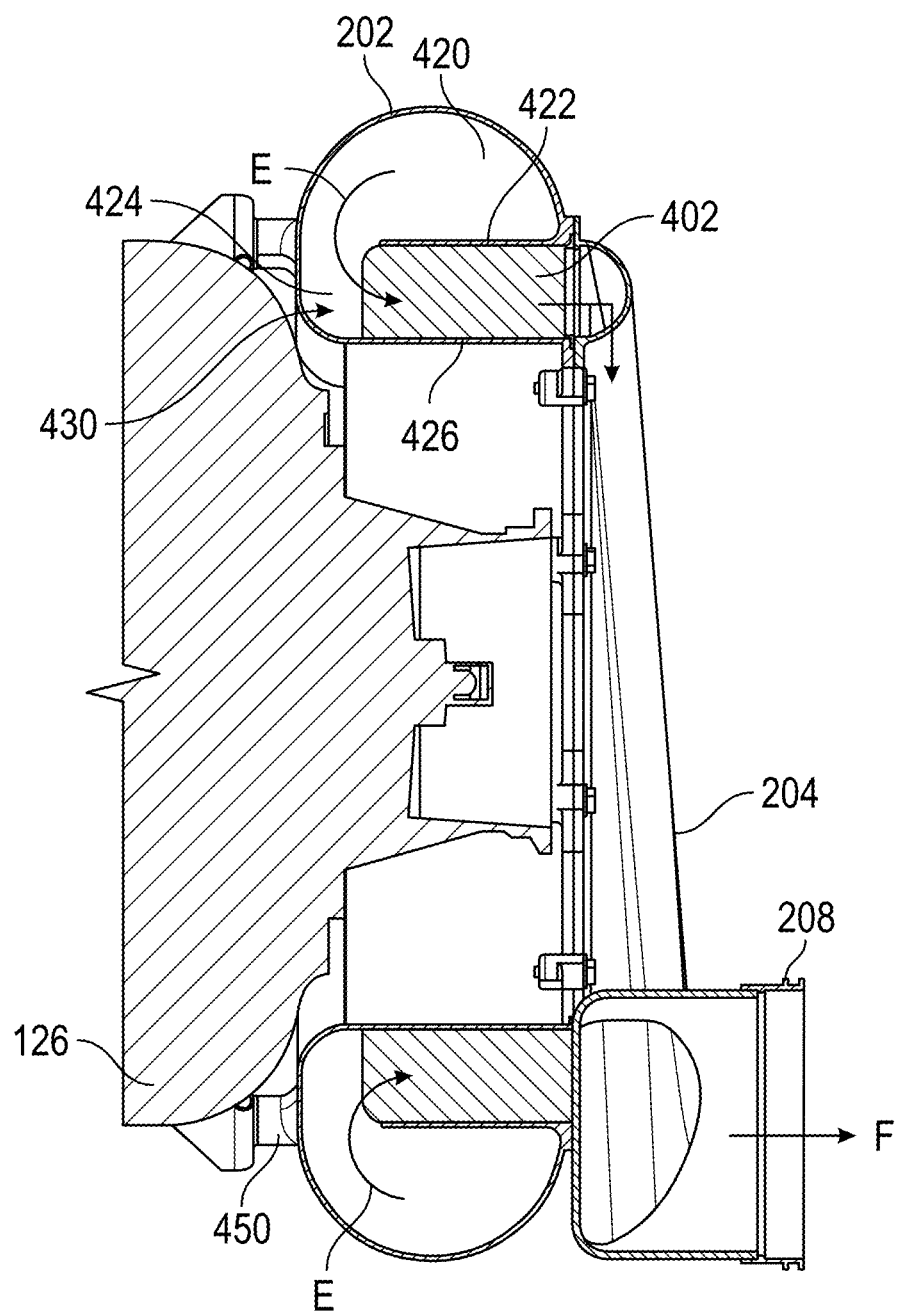
FIG. 4 is cross-section of the assembly shown in FIG. 4 taken along axis C.

FIG. 4 shows a cross-section taken along axis C of FIG. 3. Air that enters the inlet housing 202 initially travels in an outer passage 420. The outer passage 420 is at least partially separated from an inner passage 424 by a dividing wall 422. The inner passage 424 is at least partially surrounded by the outer passage and, as such, is disposed radially inwardly from the outer passage. A core 402 is disposed in the inner passage 424. The core removes ozone from air that has left the outer passage 420 and entered the inner passage 424. The core is illustrated as being ring shaped and having inner (Id) and outer (Od) diameters. The movement of air from the outer passage 420 to the inner passage 424 is generally shown by flow arrows E. As can be seen in FIG. 4, the converter 202 surrounds a portion of the turbine 126. This may, in one embodiment, allow for a reduced length combination of ACM and ozone converter than was previously possible using, for example, an ozone converter as shown in FIG. 2.

Figure 5A:
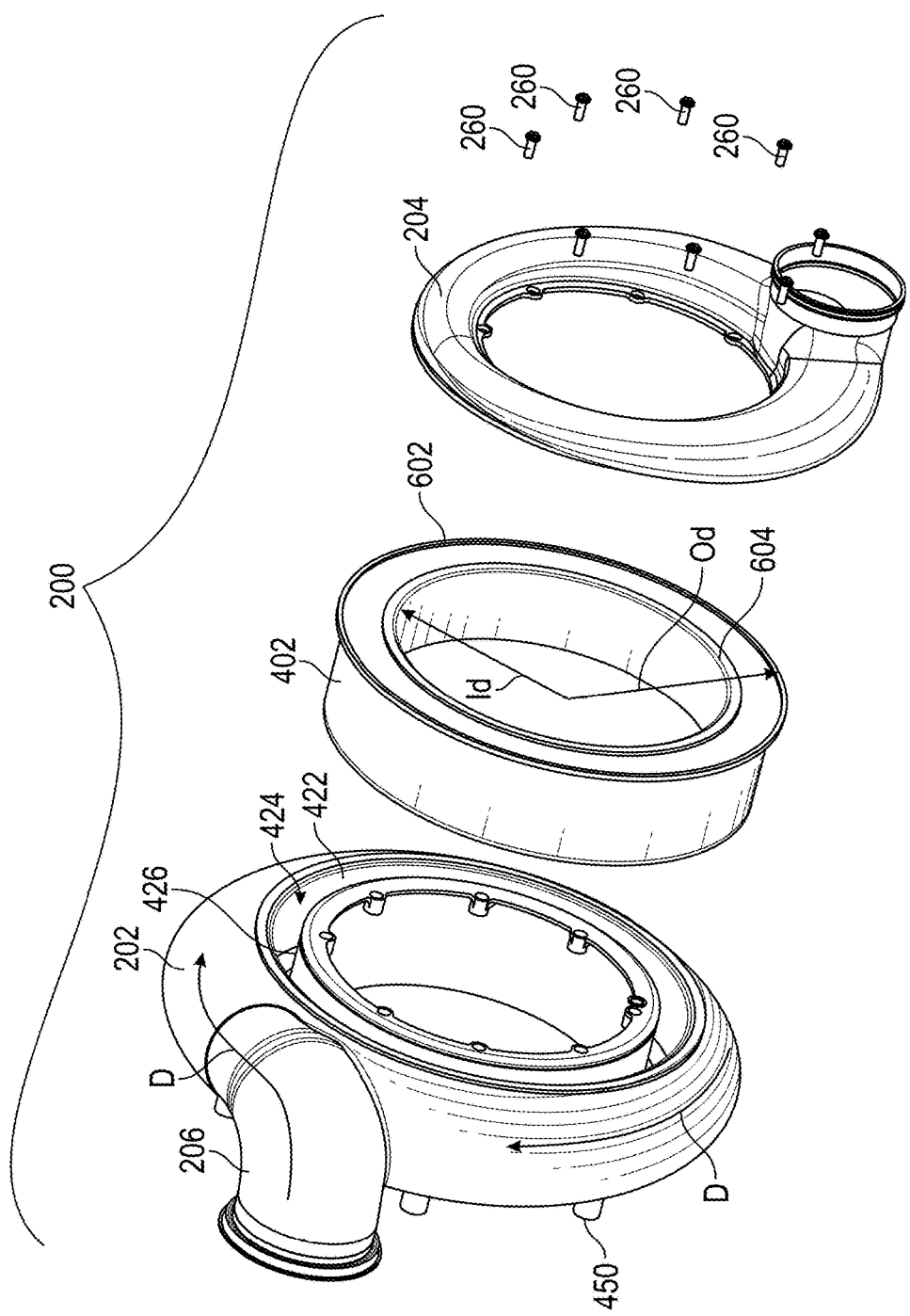
FIGS. 5A and 5B shown exploded views of an example annular ozone converter.
Figure 5B:
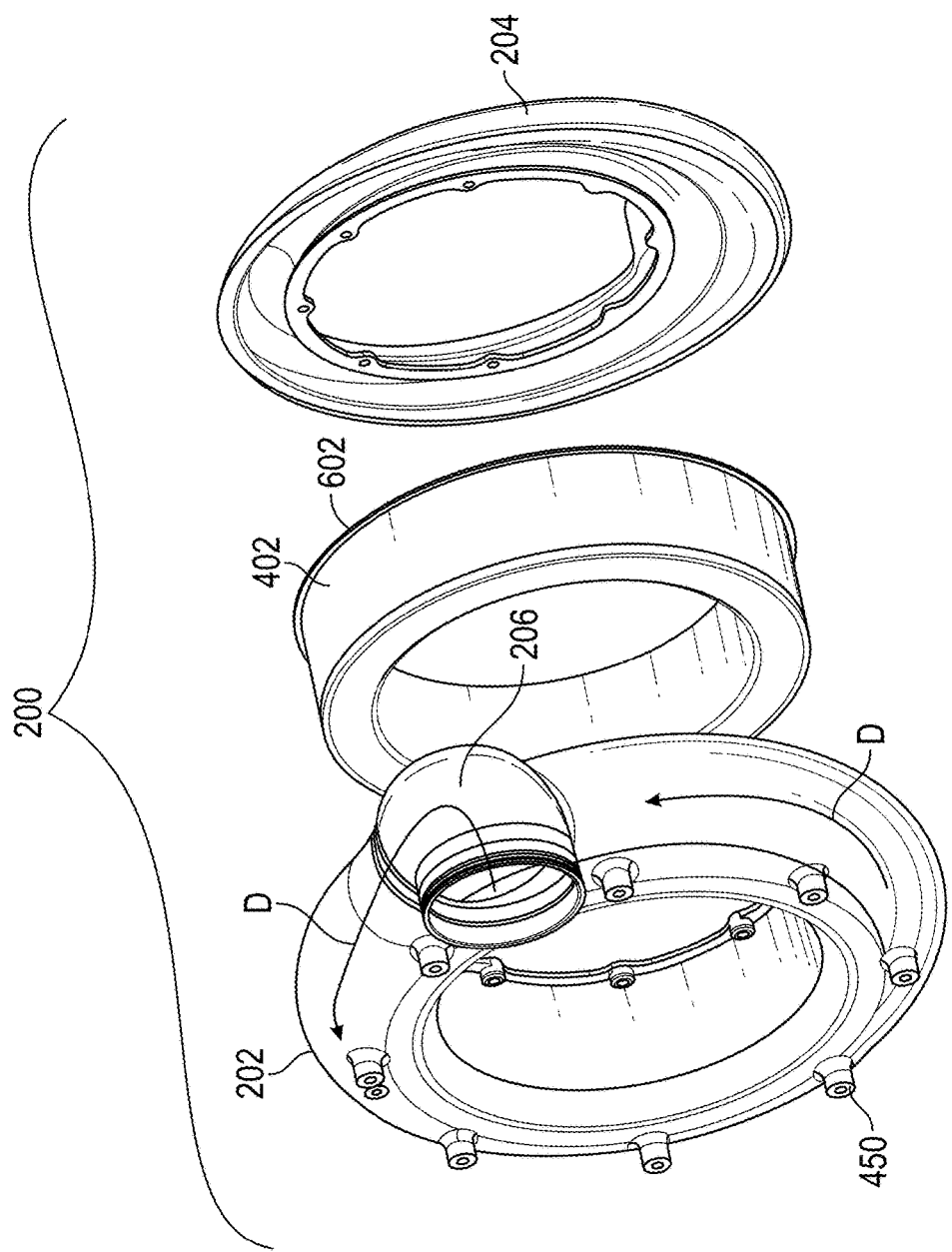

FIGS. 5A and 5B are exploded views of the converter 200 and are discussed with reference to FIG. 4. The inlet housing 202 is generally formed as a torus having an inner wall 426. The inner passage 424 is generally defined as between the inner wall 426 and the dividing wall 422. Of course, the inner passage could also include at least some volume not so constrained such as shown by region 430.

The core 402 is disposed at least partially in the inner passage 424. As illustrated, the core is contained between the inner wall 426 and the dividing wall 422. A portion of the core may extend beyond the dividing wall 422 in certain embodiments but this is not required.

Air enters the inlet housing 202 and initially travels in a circular direction as illustrated by arrow D in outer passage 420. The air then travels around the outer passage and eventually enters the inner passage 424 and passes through the core 402. The movement from the outer passage 420 and through the inner passage 424 (and core 402) is shown by arrows E.

The inlet housing 202 may include one or more mounting elements 450 that allow it to be coaxially mounted to the turbine 126.

After passing through the core 402, the air then enters the outlet housing 204. The outlet housing 204 is, in one embodiment, a volute that includes outlet 208. The volute shaping of the outlet housing 204 helps to cause the air to travel in the direction of arrow F to allow more uniform air travel through all or most portions of the core 204.

Figure 6:
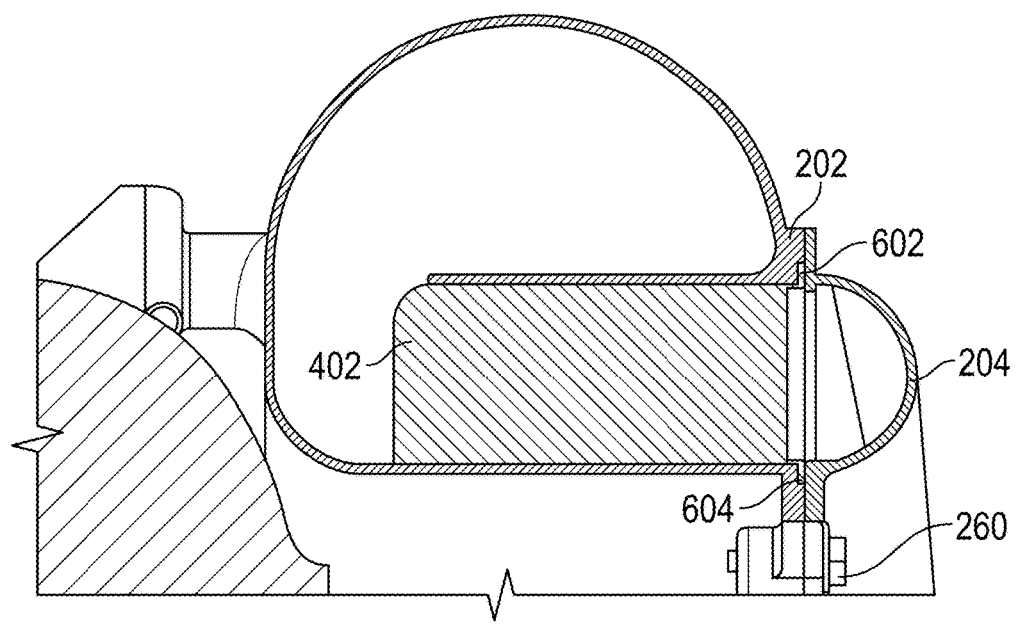
FIG. 6 is an enlarged portion of FIG. 4.

With reference now to FIG. 6, in one embodiment, the core 402 may include one or more flanges 602, 604. These flanges 602, 604 may fit between the inlet housing 202 and the outlet housing 204. When fastening elements 260 are secured, the core 402 may be held in place. Additionally, flanges 602 and 604 act as a seal, directing airflow through core 402 without leakage. Removal of the fastening elements 260 may allow the core 402 to be removed for cleaning or replacement.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An ozone converter comprising:
a toroidal shaped inlet housing;
an outlet housing that is removably coupled to the inlet housing, wherein the inlet and outlet housings define inner and outer circular passages; and
a ring shaped ozone removable core disposed at least partially within the inlet housing,
wherein the toroidal shaped inlet housing is configured such that air entering the toroidal shaped inlet housing travels in a circular path through both the inner and outer circular passages.

2. The ozone converter of claim 1, wherein the toroidal shaped inlet housing includes:
an inlet section;
where the circular inner passage is radially inward from the circular outer passage.

3. The ozone converter of claim 2, further comprising:
a dividing wall separating at least a portion of the circular outer passage from the circular inner passage.

4. The ozone converter of claim 3, wherein the ozone converter ring is at least partially disposed between the dividing wall and an inner wall of the inlet housing.

5. The ozone converter of claim 1, wherein the outlet housing is shaped as a volute.

6. The ozone converter of claim 1, wherein the ring shaped ozone removable core includes at least one flange disposed between the inlet housing and the outlet housing.

7. An environment control system (ECS) comprising:
an air cycle machine including a turbine and a compressor; and
an ozone converter coupled to the turbine and surrounding a portion of the turbine;
wherein the ozone converter includes:
a toroidal shaped inlet housing, the toroidal shaped inlet housing configured such that air entering the toroidal shaped inlet housing travels in a circular path, wherein the inlet housing defines inner and outer passages and the air passes through both the inner and outer passages;
an outlet housing that is removably coupled to the inlet housing; and
a ring shaped ozone removing core disposed at least partially within the inlet housing.

8. The ECS of claim 7, wherein the toroidal shaped inlet housing includes:
an inlet section;
an outer passage formed within the housing; and
an inner passage formed within the inner housing and radially inward from the outer passage.

9. The ECS of claim 8, wherein the toroidal shaped inlet housing further:
a dividing wall separating at least a portion of the outer passage from the inner passage.

10. The ECS of claim 9, wherein the ozone converter ring is at least partially disposed between the dividing wall an inner wall of the inlet housing.

11. The ECS of claim 9, wherein the outlet housing is shaped as a volute.

12. The ECS of claim 9, wherein the ring shaped ozone removable core includes at least one flange disposed between the inlet housing and the outlet housing.

* * * * *